Jan. 3, 1967   K. C. EBERT   3,295,862
CAR SAFETY BELT
Filed June 23, 1964
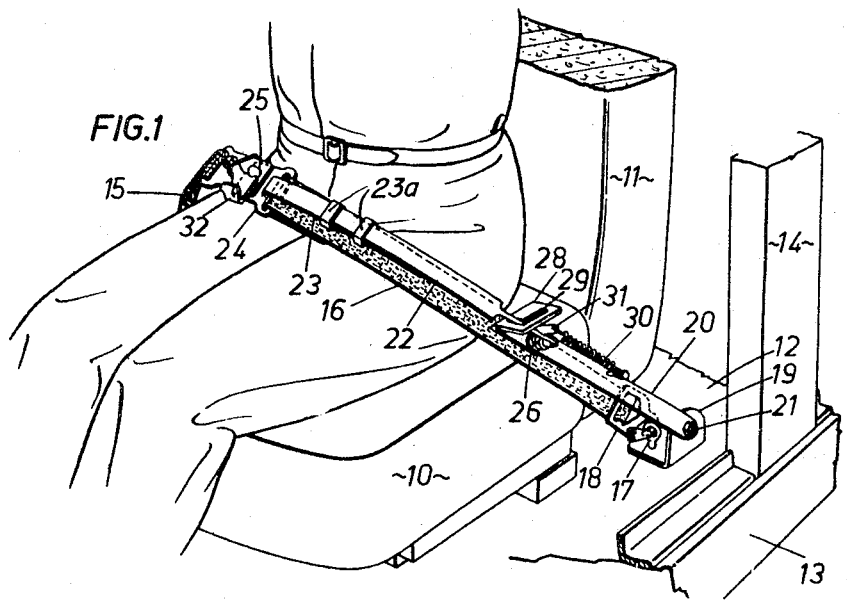
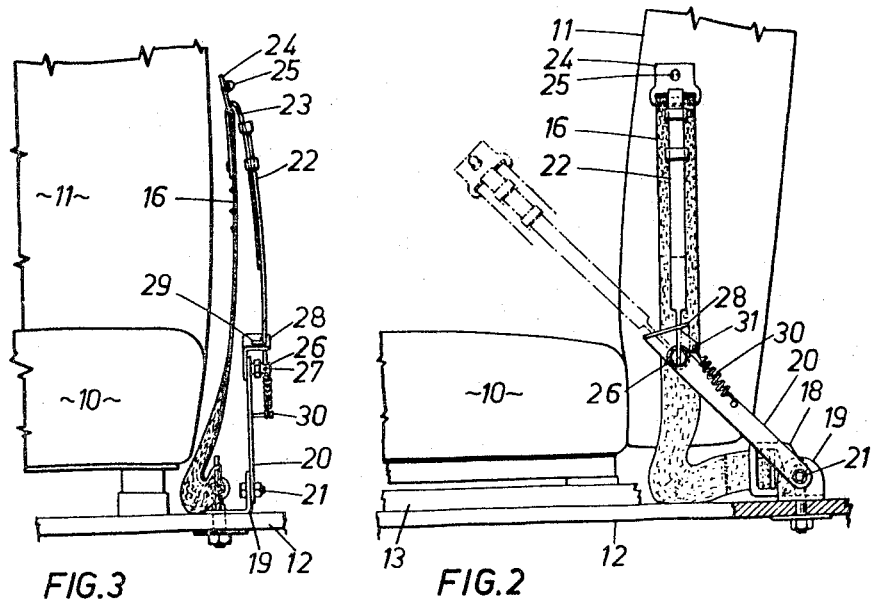
FIG.1
FIG.2
FIG.3
INVENTOR
Kenneth C. Ebert

United States Patent Office 3,295,862
Patented Jan. 3, 1967

3,295,862
CAR SAFETY BELT
Kenneth C. Ebert, 27 Armstrong St., New Liskeard,
Ontario, Canada
Filed June 23, 1964, Ser. No. 377,209
4 Claims. (Cl. 280—150)

This invention relates to a safety belt for the operator of a vehicle such as the driver of an automobile and in particular to a safety belt that can be fastened and released by the driver with one hand while the other hand is fully employed in steering the vehicle.

Various types of safety belts have heretofore been proposed for safely fastening the driver of a vehicle such as an automobile so that in the event of an accident or sudden stop, the operator of the vehicle or the passenger will not be thrown out of the vehicle. Such prior devices have had the disadvantage, particularly with reference to the safety belt for the driver of the vehicle, that they required the driver to use both hands when connecting the two straps across his waist. This was very inconvenient and frequently dangerous particularly if the driver attempted to fasten or disconnect the belt while the car was in motion.

It is an object of the present invention to provide a safety belt for the operator of the vehicle wherein the safety belt can be fastened in position to span the waist of the driver of the vehicle by the driver using one hand, leaving the other hand free to steer the vehicle.

With the foregoing and other objectives in mind the safety belt of the present invention comprises the combination of: (a) two flexible straps having means at one end thereof for anchoring each strap to the car frame in spaced apart relationship to accommodate the operator therebetween, one strap being located adjacent the door on the driver's side of the seat, the other ends of the two straps being designated as free ends; (b) a substantially rigid articulated arcuate strap support member having one end pivotally mountable on the frame adjacent to the door and to the flexible strap adjacent to said door, the other ends of the straps being designated as the free ends, said support member being adapted to be manually swung from a substantially vertical position to a normal position to span the waist of an occupant of the seat; (c) spring biased latch means retaining said member in the position to which it is manually moved; (d) a latch plate slidably carried on the free end of the support member, said latch plate being connected to the free end of the contiguous strap thereby restraining the latch plate against extension beyond a set point; (e) and a manually operable catch carried by the free end of the other strap whereby said catch can be manually manipulated by one hand to engage said latch plate whereby said two straps are joined together to span the waist of the driver or to be disconnected from each other.

For an understanding of the construction and operation of the invention reference is to be had to the following disclosure which is illustrated by the accompanying drawings which form part of the disclosure, in which:

FIGURE 1 is a perspective view showing the safety belt of the present invention fastened across or spanning the waist of the driver of the vehicle;

FIGURE 2 is a side elevation of the arcuate strap support member which is mounted between the door and the left hand end of the driver's seat;

FIGURE 3 is a front elevation of FIGURE 2.

Like characters of reference refer to like parts throughout the specification and drawing.

The drawings illustrate the use, operation and construction of the invention and shows it installed in the motor vehicle for use of the driver of the vehicle. In the drawings, 10 indicates the driver's seat, 11 the back of the seat, 12 the floor, 13 part of the side frame, and 14 the door post on the driver's side of the vehicle against which the door on the driver's side of the seat closes, the door not being shown.

The safety belt consists of a pair of flexible heavy textile straps 15, 16 of the kind presently in use, and spaced apart to accommodate the driver therebetween as shown. The strap 15 which is on the right-hand side of the operatorator is fastened to the floor or frame of the car in accordance with conventional practice and the strap 16 is also fastened to the floor 12 in the conventional fashion and positioned between the left-hand end of the driver's seat and the door opening as shown by means of bolt 17 which is secured to the buckle 18 which is carried on the lower end of the strap 16.

The novel arrangement of the present invention comprises a bracket 19 which is fastened to the floor 10 of the vehicle by the bolt 17, a strap supporting member pivotally carried by the bracket 19 and adapted to be manually swung from an upright position to a diagonal position to lie over the lap of the driver as hereinafter described. The support member, in the present embodiment comprises a substantially rigid arm 20 which has its lower end pivotally connected to the bracket 19 by the bolt 21, an arcuate substantially rigid member 22 which is pivotally carried on the upper end of the member 20, and an arcuate sliding member 23 telescopically carried on the arcuate member 22, the sliding member 23 extending beyond the upper end of the member 22 and provided with a latch plate 24 having a latch pin 25. The arcuate sliding member 23 is slidably held in position on the arcuate member 22 by means of a pair of bands 23a which are attached to the member 22 and surround the sliding member 23. The upper end of the strap 16 is adjustably connected, in a conventional manner, to the latch plate 24 to restrain the latch plate gainst extension beyond a predetermined point, the adjustment being provided so that the belt can be adjusted to comfortably span tne waist of the driver. The pivotal mounting of the arcuate member 22 includes a pivot pin 26 permitting pivotal swinging of the arcuate member 22 relative to the arm 20, the arcuate member 22 being hingedly connected to the pivot pin by means of a hinge pin 27 permitting the arcuate member 22 to drop from a substantially vertical position to a position overlying the lap or waist of the driver. The pivotal and hinging movement of the arcuate member 22 is restricted by a bracket 28 which is carried on the top end of the arm 20, the bracket having an L-shaped slot 29 through which the lower end of the arcuate member 22 passes. The arcuate member is biased by a spring 30 which has one end attached to the arm 20 and its opposite end attached to a lug 31 carried on the lower end of the arcuate member between the bracket and the pivot 26. The spring normally urges the arcuate member 22 into a substantially upright position and does not interfere with the arm travelling in the slot to and from the ends of the said slot.

The free end of the right-hand strap 15 is provided with a manually operable latch which is of the snap action type so that when it is placed over the latch pin 25 and pressed downwardly the two parts are automatically locked together and can be released by the simple action of pressing a thumb or finger actuated button which will release the catch from the latch pin.

The safety belt is used in the following manner. When the safety strap is not in use, the righ-hand strap 15 will lay on the seat at the right of the driver, the left-hand strap 16 will be held in a substantially vertical position as shown in FIGS. 2 and 3 when not in use. When the driver wishes to connect the safety belt across his waist or lap he will take the arcuate member 22 with his left hand moving the member along the arcuate slot until the strap is resting on his lap where it will remain without holding and slide the strap 23 outwardly until it reaches its extended position. He will then take the snap fastener 32 which is on the end of the strap 15 and place it over the latch plate 24 with snap fastener registering with the latch pin 25 and then snap the two together. This operation can be done while the vehicle is in motion since the driver will always have one hand free to hold onto the steering wheel. To release the belt, the driver merely has to press the release button and separate the same snap fastener from the latch pin and return the arcuate member to the position shown in FIG. 2.

The embodiments of this invention in which an exclusive property or privilege is claimed are defined as follows:

1. In a motor vehicle having a frame, a driver's seat and a door hinged on the driver's side of the vehicle, a safety belt for the driver of the vehicle comprising in combination (a) two flexible straps having means at one end thereof for anchoring the straps to the frame in spaced apart relationship to accommodate the driver therebetween, one strap being located adjacent said door the other ends of the two straps being designated as the free ends;

(b) a substantially rigid articulated arcuate strap support member having one end pivotally mountable to the frame adjacent to the door and to the anchored end of the adjacent flexible strap, said support member being adapted to be manually swung from a substantially vertical position to a normal position to span the waist of an occupant of the seat;

(c) spring biased latch means retaining said member in the position to which it is manually moved;

(d) a latch plate slidably carried on the free end of the support member, and having its extension beyond a set point restrained by one of said flexible straps;

(e) and a complemental manually operable catch carried by the free end of the other strap whereby said catch can be manually manipulated by one hand to engage said latch plate whereby said two straps are joined together to span the waist of the driver or to be disconnected therefrom.

2. A safety belt according to claim 1 in which the support member comprises a substantially rigid lower arm having a bracket pivotally mounted on its lower end permitting pivotal movement of said arm, a substantially rigid arcuate telescopic member pivotally mounted on the upper end of the support member, the latch plate being mounted on the free end of the telescopic member and directly connected to its flexible strap.

3. A safety belt according to claim 1 in which the latch plate is telescopically carried on the free end of the support member.

4. A safety belt according to claim 1 in which the substantially rigid articulate arcuate strap support includes an arcuate arm pivotally and hingedly connected to a fixed portion of said support for said swinging movement from the substantially vertical position to a normal position to span the waist of an occupant of the seat and the said spring biased latch retains said arcuate arm in the position to which it is manually swung.

References Cited by the Examiner
UNITED STATES PATENTS

| 2,244,650 | 6/1941 | Curran | 297—390 |
| 2,245,899 | 6/1941 | Campbell | 297—390 |
| 2,861,626 | 11/1958 | Mills | 280—150 |

LEO FRIAGLIA, *Primary Examiner.*

BENJAMIN HERSH, *Examiner.*

W. A. MARCONTELL, *Assistant Examiner.*